United States Patent
Yang

(10) Patent No.: US 10,130,879 B2
(45) Date of Patent: Nov. 20, 2018

(54) GAME SYSTEM

(71) Applicants:BOE TECHNOLOGY GROUP CO., LTD., Beijing (CN); K-tronics (Su Zhou) Technology Co., Ltd., Suzhou, Jiangsu Province (CN)

(72) Inventor: Qi Yang, Beijing (CN)

(73) Assignees: BOE TECHNOLOGY GROUP CO., LTD., Beijing (CN); K-TRONICS (SU ZHOU) TECHNOLOGY CO., LTD., Suzhou, Jiangsu Province (CN)

( * ) Notice: Subject to any disclaimer, the term of this patent is extended or adjusted under 35 U.S.C. 154(b) by 127 days.

(21) Appl. No.: 15/203,707

(22) Filed: Jul. 6, 2016

(65) Prior Publication Data
US 2017/0239562 A1 Aug. 24, 2017

(30) Foreign Application Priority Data
Feb. 18, 2016 (CN) .......................... 2016 1 0090765

(51) Int. Cl.
| A63F 9/24 | (2006.01) |
| A63F 13/285 | (2014.01) |
| A63F 13/25 | (2014.01) |
| A63F 13/24 | (2014.01) |

(52) U.S. Cl.
CPC ............ *A63F 13/285* (2014.09); *A63F 13/24* (2014.09); *A63F 13/25* (2014.09)

(58) Field of Classification Search
None
See application file for complete search history.

(56) References Cited

U.S. PATENT DOCUMENTS 6,697,043 B1 * 2/2004 Shahoian ................ A63F 13/06 345/156
7,082,570 B1 * 7/2006 von Wiegand ......... A63F 13/06 345/156

(Continued)

FOREIGN PATENT DOCUMENTS

CN 204142814 U 2/2015

OTHER PUBLICATIONS

First Chinese Office Action (including English translation) dated Jun. 1, 2016, for corresponding Chinese Application No. 201620127363.6.

*Primary Examiner* — Paul A D'Agostino
(74) *Attorney, Agent, or Firm* — Kinney & Lange, P.A.

(57) ABSTRACT

A game system is disclosed. The game system includes a computer, a display device and an operation device. The computer is configured to run a game, the display device is configured to display a game image, and the operation device is configured to input an operation command into the computer. A vibrator is provided in the display device and/or the operation device. The computer is further configured to send a vibration signal to the display device and/or the operation device according to game information, so as to drive the vibrator to generate vibration. According to the above game system, the display device and the operation device such as mouse or keyboard may generate vibration by means of the vibrator, according to game information, present vibration sensing and tactile for a player, thereby enabling the player to be more personally on the scene in the game.

15 Claims, 2 Drawing Sheets

(56) References Cited

U.S. PATENT DOCUMENTS

| | | | | |
|---|---|---|---|---|
| 8,754,757 B1* | 6/2014 | Ullrich | G06F 3/016 | 340/407.1 |
| 8,768,782 B1* | 7/2014 | Myslinski | G06Q 10/10 | 705/26.1 |
| 8,823,507 B1* | 9/2014 | Touloumtzis | H04L 67/24 | 340/501 |
| 2001/0035854 A1* | 11/2001 | Rosenberg | A63F 13/06 | 345/156 |
| 2005/0113167 A1* | 5/2005 | Buchner | A63F 13/02 | 463/30 |
| 2006/0109256 A1* | 5/2006 | Grant | G06F 3/016 | 345/173 |
| 2007/0123351 A1* | 5/2007 | Cheng | A63F 13/06 | 463/38 |
| 2008/0057867 A1* | 3/2008 | Trappeniers | H04L 67/14 | 455/41.2 |
| 2008/0132313 A1* | 6/2008 | Rasmussen | G07F 17/32 | 463/16 |
| 2009/0189790 A1* | 7/2009 | Peterson | G06F 3/016 | 341/22 |
| 2009/0210568 A1* | 8/2009 | Peterson | G06F 3/016 | 710/15 |
| 2010/0035687 A1* | 2/2010 | Chou | A63F 13/10 | 463/37 |
| 2010/0267409 A1* | 10/2010 | Lee | A63F 13/12 | 455/513 |
| 2011/0021272 A1* | 1/2011 | Grant | A63F 13/10 | 463/30 |
| 2011/0121953 A1* | 5/2011 | Grant | A63F 13/245 | 340/407.1 |
| 2011/0130173 A1* | 6/2011 | Im | G06F 3/016 | 455/567 |
| 2012/0084467 A1* | 4/2012 | Birnbaum | G06F 3/016 | 710/16 |
| 2013/0150158 A1* | 6/2013 | Kang | G07F 17/3223 | 463/31 |
| 2013/0198625 A1* | 8/2013 | Anderson | G06F 3/016 | 715/701 |
| 2014/0256431 A1* | 9/2014 | Pope | A63F 13/211 | 463/31 |
| 2014/0267911 A1* | 9/2014 | Grant | H04N 21/42222 | 348/563 |
| 2014/0325448 A1* | 10/2014 | Han | G06F 3/04817 | 715/835 |
| 2014/0340316 A1* | 11/2014 | Gu | G06F 3/016 | 345/173 |

* cited by examiner

GAME SYSTEM

CROSS-REFERENCE TO RELATED APPLICATION

This application claims the benefit of Chinese Patent Application No. 201610090765.8 filed on Feb. 18, 2016 in the State Intellectual Property Office of China, the whole disclosure of which is incorporated herein by reference.

BACKGROUND OF THE INVENTION

Field of the Invention

Embodiments of the present disclosure relate to a technical field of electronic game, and more particularly, to a game system capable of providing vibration experience in the game.

Description of the Related Art

Currently, various electronic games (for example, a console game, a network game or the like) adopting a PC (personal computer) as a carrier and an operation device are progressively penetrating into people's daily life. As compared with various dedicated game hosts, for example, Microsoft corporation's Xbox series and Sony corporation's PlayStation series, a PC game is more widely accepted by players and publics. The PC game is mainly run depending on devices such as a PC, a display, a mouse, a keyboard and the like. By means of various devices described above, a player may receive game image information displayed on the display, and input an operation command. However, a game system formed from various devices described above cannot present tactile experience for the player, and it is thus difficult to enable the player to be personally on the scene.

SUMMARY OF THE INVENTION

The present disclosure aims to solve at least one problem in the prior art, and provides a game system capable of presenting vibration sensing and tactile for a player in a game, thereby enabling the player to be more personally on the scene in the game.

In order to achieve the above object, there is provided a game system, comprising a computer, a display device and an operation device, wherein the computer is configured to run a game, the display device is configured to display a game image, and the operation device is configured to input an operation command into the computer; wherein a vibrator is provided in the display device and/or the operation device; the computer is further configured to send a vibration signal to the display device and/or the operation device according to game information, so as to drive the vibrator to generate vibration.

Optionally, each of the display device and the operation device is provided with the vibrator; the computer sends a first vibration signal to the display device, and the display device generates a second vibration signal according to the first vibration signal, and broadcasts the second vibration signal; the display device and the operation device receive the broadcasted second vibration signal, and implement or do not implement vibration in response to the broadcasted second vibration signal.

Optionally, the display device comprises a display panel and a support, and the support is provided with the vibrator.

Optionally, the operation device comprises a mouse comprising a mouse body, a mouse button, a mouse wheel and the vibrator, wherein the vibrator is provided in the mouse body and/or the mouse button and/or the mouse wheel.

Optionally, the operation device comprises a keyboard comprising a keyboard base and a plurality of key positions, each key position being provided with a keyboard button; each of the key positions is provided with the vibrator, and/or the keyboard base is provided with the vibrator.

Optionally, the game system further comprises a wristwatch or a wristband as the display device or the operation device, and the wristwatch or the wristband is provided with the vibrator.

Optionally, the computer sends the first vibration signal to the display device in a DDC/CI command format.

Optionally, the display device broadcasts the second vibration signal in a ZigBee command, Bluetooth or WiFi signal format.

Optionally, the computer comprises a personal computer.

Optionally, the computer sends the vibration signal to the display device and/or the operation device in one or more situations chosen from explosion, hit, shoot and impact in the game.

The present disclosure possesses the following advantageous effects:

In the game system according to the embodiments of the present disclosure, vibrators are provided in the display device and the operation device, and the display device and the operation device such as mouse or keyboard may generate vibration by means of the vibrator, according to game information, present vibration sensing and tactile for a player, thereby enabling the player to be more personally on the scene in the game.

BRIEF DESCRIPTION OF THE DRAWINGS

The drawings are intended to provide a comprehensive understanding of the present disclosure, form a portion of the description, and explain the present disclosure together with the specific embodiments below, but not intended to limit the present disclosure. In the drawings.

In the drawings.

1—computer; 2—display device; 3—operation device; 4—wristwatch or wristband; 20—display panel; 21—support; 30—mouse; 31—keyboard; 300—mouse body; 301—mouse button; 302—mouse wheel; 310—keyboard base; 311—keyboard button.

DETAILED DESCRIPTION OF PREFERRED EMBODIMENTS OF THE INVENTION

The specific embodiments of the present disclosure will be further described in detail in combination with the drawings below. It should be understood that the specific embodiments described herein are merely intended to describe and explain the present disclosure, but not intended to limit the present disclosure.

Figure 1:
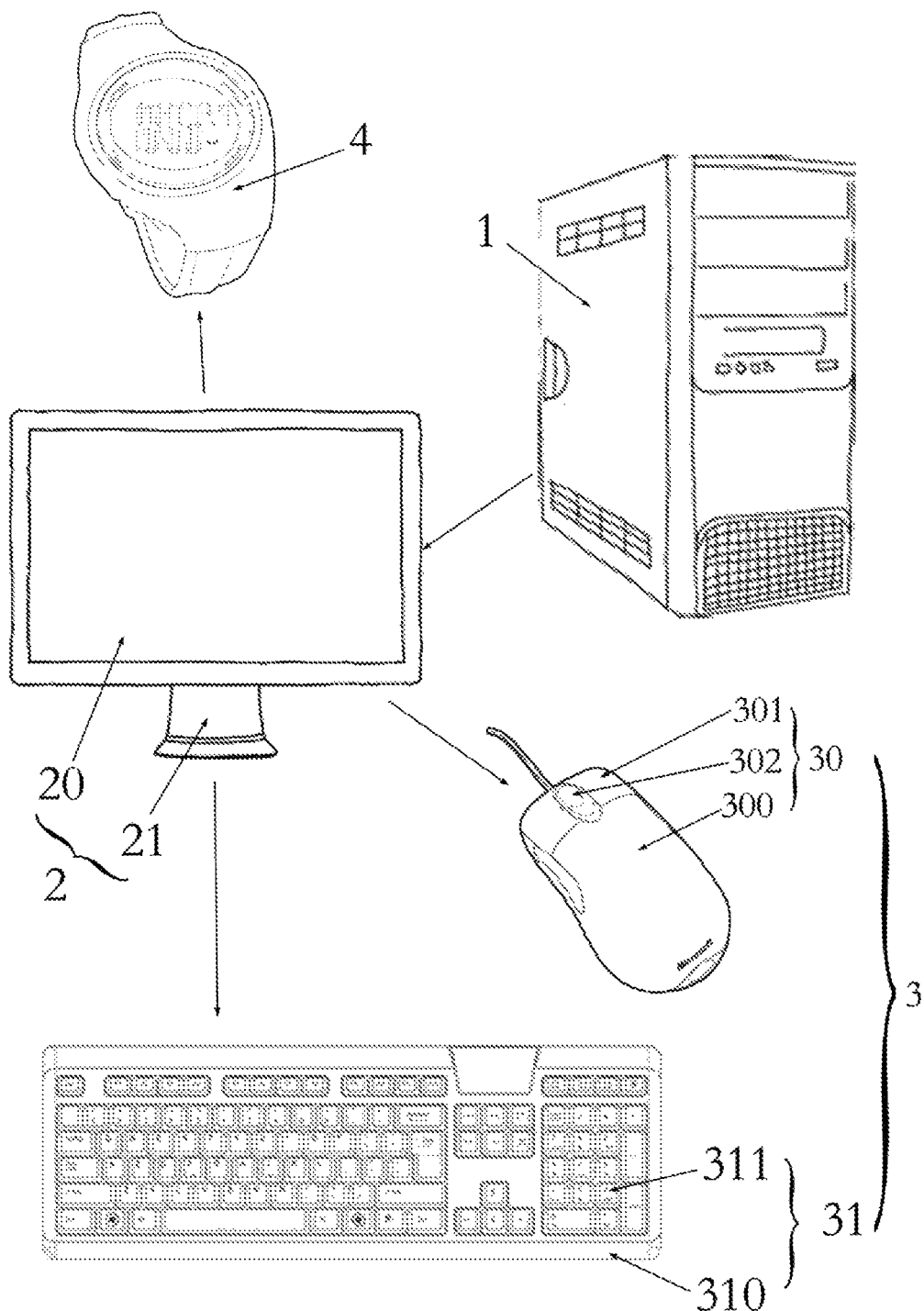
FIG. 1 is a schematic view of a game system according to an embodiment of the present disclosure.

The present disclosure provides a game system and embodiments thereof. In the embodiment of the present disclosure, as shown in FIG. 1, the game system comprises a computer 1, a display device 2 and an operation device 3. The computer 1 is a personal computer (PC) and configured to run a game. The display device 2 comprises a display, for example, a LCD (liquid crystal display), etc., and the display device 2 is connected to the computer 1 and configured to display a game image. The operation device 3 comprises a mouse 30, a keyboard 31, etc., and is configured to input an operation command into the computer 1.

Vibrators are provided in the display device 2 and the operation device 3; the computer 1 is further configured to send a vibration signal to the display device 2 and the operation device 3 according to game information, so as to drive the vibrator to generate vibration. In particular, the computer 1 sends the vibration signal to the display device 2 and the operation device 3 in one or more situations chosen from explosion, hit, shoot and impact in the game.

Specifically, the computer 1 sends a first vibration signal to the display device 2, and the display device 2 generates a second vibration signal according to the first vibration signal, and broadcasts the second vibration signal; the display device 2 and the operation device 3 receive the broadcasted second vibration signal, and implement or do not implement vibration in response to the broadcasted second vibration signal.

Next, taking Counter-Strike (CS) game in which a player shoots as an example to describe the principle and process of the display device 2 and the operation device 3 generating vibration in detail.

Figure 2:
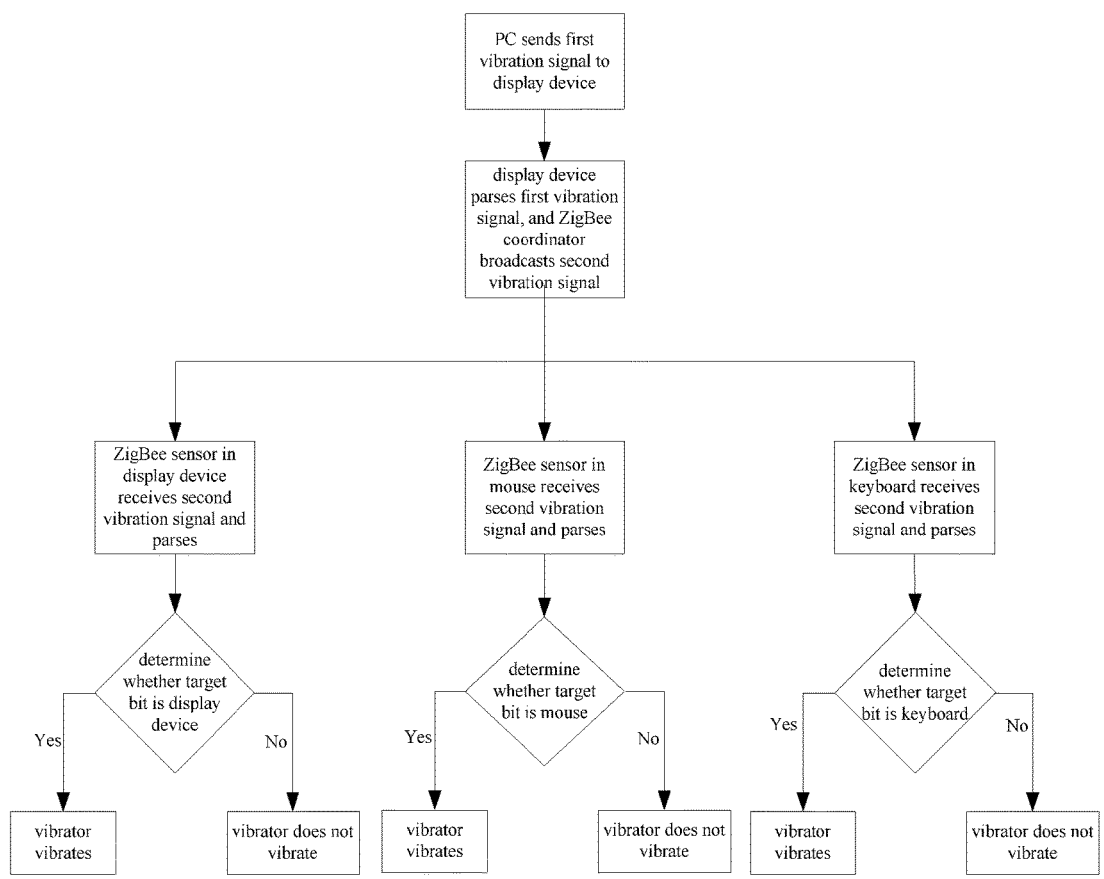
FIG. 2 is a schematic flow chart showing that a display device and an operation device are controlled to generate vibration.

As shown in FIG. 2, if the player shoots, the PC sends a command (i.e., the first vibration signal) to the display device 2 via a signal line (for example, VGA, DVI, HDMI or the like), wherein the command may be in a DDC/CI (Display Data Channel Command Interface) format. For example, the command sent to the display device 2 by the PC may be a group of codes comprising A, B, C, D, E and F, where characters A—F refer to six segments (it does not mean that the value of the segment is equal to one of these six characters, for example, the value of the segment A may be 6E, and the value of the segment B may be 51, and so on). As an example, A refers to start bit information, B refers to source bit information, C refers to length bit information, D refers to command bit information, E refers to status bit information, and F refers to check bit information. Taking the fifth segment E as an example, if it is equal to E1, then it may mean that the player hits an explosive, accordingly, the explosive explodes; if it is equal to E2, then it may mean that the player hits an enemy; and if it is equal to E3, then it may mean that the player not only fails to hit the explosive, but also fails to hit the enemy.

The display device 2 parses the DDC/CI command after receiving the first vibration signal so as to obtain the information which the segments A~F refer to, respectively. For example, it parses the fifth segment E so as to determine which one of E1, E2 or E3 the segment E refers to. In particular, the following statuses may be preset: if E is equal to E1, then the display device 2 vibrates, and it means that the player hits an explosive, accordingly, the explosive explodes; if E is equal to E2, then the mouse 30 vibrates, and it means that the player hits an enemy; and if E is equal to E3, then the display device 2, the mouse 30 and the keyboard 31 all do not vibrate.

The display device 2 generates a second vibration signal containing the above parsed content according to the received first vibration signal, and broadcasts the second vibration signal. The format of the second vibration signal may be a ZigBee command, Bluetooth or WiFi signal. Taking that the second vibration signal is a ZigBee command as an example, the display device 2 is provided with a ZigBee coordinator and a ZigBee sensor, while the devices such as mouse 30, keyboard 31 are provided with a ZigBee sensor. For example, the ZigBee coordinator broadcasts a group of codes comprising G, H, I and J, where characters G—J refer to four segments. As an example, G refers to the information which the above parsed segment E refers to, i.e., E refers to E1, E2 or E3; J refers to a target bit, for example, if J is equal to J1, then the referred information refers to the display device 2, if J is equal to J2, then the referred information refers to the mouse 30, and if J is equal to J3, then the referred information refers to the keyboard 31.

The ZigBee sensors in the display device 2, the mouse 30 and the keyboard 31 receive the second vibration signal broadcasted by the ZigBee coordinator, and parse the second vibration signal. For example, if the referred information in G of the parsed second vibration signal refers to E=E1, and the referred information in J refers to J1, then the vibrator in the display device 2 generates vibration since the target bit refers to the display device 2 after the display device 2 parses the above information, and then the vibrators in the mouse 30 and the keyboard 31 do not generate vibration since the target bit does not refer to the mouse 30 and the keyboard 31 after the mouse 30 and the keyboard 31 parse the above information. As an alternative, if the referred information in G of the parsed second vibration signal refers to E=E2, and the referred information in J refers to J2, then the vibrator in the display device 2 does not generate vibration since the target bit does not refer to the display device 2 after the display device 2 parses the above information, and then the vibrator in the mouse 30 generates vibration since the target bit refers to the mouse 30 after the mouse 30 parses the above information, and then the vibrator in the keyboard 31 does not generate vibration since the target bit does not refer to the keyboard 31 after the keyboard 31 parses the above information.

According to the above described arrangement, the game system may enable the devices such as the display device 2, the mouse 30, the keyboard 31 and the like to generate vibration according to game information, thereby presenting vibration sensing and tactile for the player, and enabling the player to be more personally on the scene in the game.

It should be noted that, in the present embodiment, it is unnecessary to broadcast by means of the ZigBee coordinator in the display device 2 or any other devices to control the vibrators in the display device 2 and the operation device 3 to vibrate. As an alternative to the embodiment, the computer 1 may directly send the vibration signal to the display device 2 and the operation device 3, so as to directly control the display device 2 and the operation device 3 to vibrate.

In addition, it should be noted that the vibrator may only be provided in the display device 2, or may only be provided in the operation device 3, if desired. Thus, only the display device 2 or the operation device 3 provided with the vibrator generates vibration in the game.

In particular, the display device 2 comprises a display panel 20 and a support 21, and if the display device 2 comprises the vibrator, the vibrator is provided in the support 21. The operation device 3 comprises a mouse 30 and a keyboard 31. In particular, the mouse 30 comprises a mouse body 300, a mouse button 301, a mouse wheel 302 and the vibrator, wherein the number of the vibrators may be one or more, and the vibrator is provided in at least one of the mouse body 300, the mouse button 301 and the mouse wheel 302. The keyboard 31 comprises a keyboard base 310 and a plurality of key positions, each key position being provided with a keyboard button 311, wherein each of the key positions is provided with the vibrator so as to enable the keyboard button 311 to vibrate, and/or the keyboard base 310 is provided with the vibrator so as to enable the keyboard base 310 to vibrate. In addition, the game system may further comprise a wristwatch or wristband 4 as the display device or the operation device, and the wristwatch or wristband may also be provided with the vibrator, to receive the signal sent by the computer 1 or the display device 2 to generate vibration.

In summary, in the game system according to the embodiments of the present disclosure, vibrators are provided in the display device 2 and the operation device 3, and the display device 2 and the operation device 3 such as mouse 30 or keyboard 31 may generate vibration by means of the vibrator, according to game information, present vibration sensing and tactile for a player, thereby enabling the player to be more personally on the scene in the game.

It should be understood that the above embodiments are merely exemplary embodiments intended to explain principle of the present disclosure, however, the present disclosure is not limited hereto. Various changes and substitutions may be made to the present disclosure by the person skilled in the art without departing from the spirit and scope of the present disclosure, and these changes and substitutions fall into the scope of the present disclosure.

What is claimed is:

1. A game system, comprising: a computer, a display device and an operation device, wherein the computer is configured to run a game, the display device is configured to display a game image, and the operation device is configured to input an operation command into the computer; wherein a vibrator is provided in the display device and/or the operation device; and the computer is further configured to send a vibration signal to the display device and/or the operation device according to game information, so as to drive the vibrator to generate vibration, wherein each of the display device and the operation device is provided with the vibrator;

wherein the computer sends a first vibration signal to the display device, and the display device parses the first vibration signal to determine parsed content of the first vibration signal and generates a second vibration signal containing the parsed content according to the first vibration signal, wherein the display device is provided with a ZigBee coordinator and a first ZigBee sensor, wherein the operation device is provided with a second ZigBee sensor, and wherein the ZigBee coordinator broadcasts the second vibration signal; and wherein the first ZigBee sensor in the display device and the second ZigBee sensor in the operation device each receive and parse the broadcasted second vibration signal, and the display device and the operation device implement or do not implement vibration in response to the broadcasted second vibration signal.

2. The game system according to claim 1, wherein the display device comprises a display panel and a support, and the support is provided with the vibrator.

3. The game system according to claim 1, wherein the operation device comprises a mouse comprising a mouse body, a mouse button, a mouse wheel and the vibrator, wherein the vibrator is provided in the mouse body and/or the mouse button and/or the mouse wheel.

4. The game system according to claim 1, wherein the operation device comprises a keyboard comprising a keyboard base and a plurality of key positions, each key position being provided with a keyboard button;

each of the key positions is provided with the vibrator, and/or the keyboard base is provided with the vibrator.

5. The game system according to claim 1, further comprising a wristwatch or a wristband as the display device or the operation device, and the wristwatch or the wristband is provided with the vibrator.

6. The game system according to claim 1, wherein the computer sends the first vibration signal to the display device in a DDC/CI command format.

7. The game system according to claim 1, wherein the display device broadcasts the second vibration signal in a ZigBee command, Bluetooth or WiFi signal format.

8. The game system according to claim 1, wherein the computer comprises a personal computer.

9. The game system according to claim 1, wherein the computer sends the vibration signal to the display device and/or the operation device in one or more situations chosen from explosion, hit, shoot and impact in the game.

10. The game system according to claim 6, wherein the display device broadcasts the second vibration signal in a ZigBee command, Bluetooth or WiFi signal format.

11. The game system according to claim 2, wherein the operation device comprises a mouse comprising a mouse body, a mouse button, a mouse wheel and the vibrator, wherein the vibrator is provided in the mouse body and/or the mouse button and/or the mouse wheel.

12. The game system according to claim 2, wherein the operation device comprises a keyboard comprising a keyboard base and a plurality of key positions, each key position being provided with a keyboard button;

each of the key positions is provided with the vibrator, and/or the keyboard base is provided with the vibrator.

13. The game system according to claim 3, wherein the operation device comprises a keyboard comprising a keyboard base and a plurality of key positions, each key position being provided with a keyboard button;

each of the key positions is provided with the vibrator, and/or the keyboard base is provided with the vibrator.

14. The game system according to claim 2, wherein the game system further comprises a wristwatch or a wristband as the display device or the operation device, and the wristwatch or the wristband is provided with the vibrator.

15. The game system according to claim 3, wherein the game system further comprises a wristwatch or a wristband as the display device or the operation device, and the wristwatch or the wristband is provided with the vibrator.

* * * * *